US005122662A

United States Patent [19]

Chen et al.

[11] Patent Number: 5,122,662

[45] Date of Patent: Jun. 16, 1992

[54] CIRCULAR INDUCTION ACCELERATOR FOR BORESHOLE LOGGING

[75] Inventors: Felix K. Chen, Newtown, Conn.; William Bertozzi, Lexington, Mass.; Gary W. Corris, Newtown, Conn.; William Diamond, Deep River, Canada; Joseph A. Doucet; Jeffrey S. Schweitzer, both of Ridgefield, Conn.

[73] Assignee: Schlumberger Technology Corporation, New York, N.Y.

[21] Appl. No.: 598,298

[22] Filed: Oct. 16, 1990

[51] Int. Cl.[5] .......... G01V 5/12

[52] U.S. Cl. .......... 250/269; 328/233

[58] Field of Search .......... 250/269, 256; 328/233, 328/237; 335/296

[56] References Cited

U.S. PATENT DOCUMENTS 3,976,879 8/1976 Turcotte .
4,093,854 6/1978 Turcotte et al. .......... 250/269
4,713,581 12/1987 Haimson .

OTHER PUBLICATIONS

"Compact Betatrons for Petroleum Logging", Proceedings of 7th International Conference on High-Power Particle Beams, vol. 2, pp. 1485–1490, 1988.

"A Stretched Betatron", A. E. Blaugrund et al., J. Appl. Phys. 57 (7), 1 Apr. 1985, pp. 2474–2476.

"The Advanced Test Accelerator (ATA), A 50-MeV, 10-KA Induction Linac", L. Reginato, IEE Transaction on Nuc.Sc., vol. NS-30, No. 4, Aug. 1983, pp. 2970–2974.

"The Use of Induction Linacs with Nonlinear Magnetic Drive as High Average Power Accelerators", D. L. Birx et al., Nuclear Instruments and Methods in Physics Research B10/11 (1985) pp. 843–845.

Ferrite Devices, McGraw-Hill Encyclopedia of Science & Technology, 5th Edition, 1982, pp. 353–354.

"An 80-Mev Model of a 300-Mev Betatron", D. W. Kerst et al., The Review of Scientific Instruments, vol. 21, No. 5, May 1950.

"Compact Betatron with Four Controlling-Field Periodicity Elements" Nuclear Techniques, V. L. Chakhlov et al., 0020-4412/86/2904, pp. 787–789, 1987.

*Primary Examiner*—Janice A. Howell
*Assistant Examiner*—Richard Hanig
*Attorney, Agent, or Firm*—Richard G. Berkley; Leonard W. Pojunas

[57] ABSTRACT

A compact circular magnetic induction accelerator (betatron) for use as a borehole gamma ray source includes a field magnet and generally circular pole pieces composed of a class of ferrite having the general formula $M^{2+}Fe_2^{3+}O_4$, where M represents two or more divalent metal ions from the group consisting of Mn, Zn and Ni. The core magnet is in the form of two symmetrical closed loops, with one leg of each loop passing axially through the circular pole pieces. The field coil and the core coil may be arranged in series or in parallel, and switching circuits are provided for effecting electron beam capture and ejection. In an illustrative borehole application, the betatron is used as a gamma ray source in a bulk density logging tool.

33 Claims, 4 Drawing Sheets

CIRCULAR INDUCTION ACCELERATOR FOR BOREHOLE LOGGING

FIELD OF THE INVENTION

The present invention relates generally to particle accelerator sources for borehole applications and, more particularly, to a circular magnetic induction accelerator (betatron) for borehole use.

CROSS REFERENCE TO RELATED APPLICATION

The invention of the present application is related to the invention disclosed in the commonly-owned U.S. application Ser. No. 07/598,482 filed concurrently herewith for Low Voltage Modulator for Circular Induction Accelerator now U.S. Pat. No. 5,077,530.

BACKGROUND OF THE INVENTION

High energy electromagnetic radiation sources are used in well logging for various applications, most principally for measuring the bulk density and lithology of earth formations. The current state of the commercial art in formation density logging tools is to use a radioactive (chemical) source, usually $^{137}Cs$, two gamma ray detectors, typically NaI, with suitable data processing circuitry and algorithms to derive mudcake and/or standoff-compensated density measurements. A photoelectric effect $P_e$ measurement (compensated or uncompensated) may also be made from the low energy part of the gamma ray energy spectrum from the density tool detectors, from which information of the lithology of aformation may be derived.

The presence of a radioactive source in such tools, however, gives rise to radiological safety hazards during use, transportation and storage of the tools. Also, the maximum energy and radiation fluxes attainable with radioactive sources are limited by the size and type of the source, which parameters are also affected by the aforementioned safety and handling considerations. Moreover, as radioactive sources emit photons continuously and isotropically, they are not readily usable for timed or focused measurements.

Efforts have been made to overcome the foregoing limitations of radioactive sources by using linear particle accelerators in well logging tools. Linear accelerators of the standing wave type are disclosed for this purpose in, for example, U.S. Pat. No. 3,976,879 to Turcotte, U.S. Pat. No. 4,093,854 to Turcotte et al., and U.S. Pat. No. 4,713,581 to Haimson. While such linear accelerators afford advantages relative to radioactive sources with respect to radiological safety, higher flux and energy outputs, and pulsed operation, they are comparatively expensive to manufacture and maintain. Their complexity and lack of reliability are also drawbacks.

The use of a betatron for borehole logging has also been proposed, at least theoretically. In a paper entitled "Compact Betatron for Petroleum Logging", Proceedings of the 7th International Conference on High-Power Particle Beams, Vol. 2, pp. 1485–90, 1988, Fisher et al. describe a type of betatron developed at the University of California, Irvine, which the authors assert could be sized for borehole use. Monte Carlo simulations of such a borehole-sized device indicate that it would compare favorably with the conventional cesium source for logging purposes. The UCI betatron, however, differs from the classical, circular betatron in that it is elongated, or stretched, in the axial direction and the charged particles move in helical, rather than circular, orbits. This device employs a torodial magnetic field in addition to the conventional betatron field to increase the circulating electron current. However, the elongated structure means that the magnetic field needs to fill a larger volume than does a conventional betatron of comparable energy. Thus, the excitation energy per pulse is higher and the repetition rate is lower than in circular induction betatrons; a disadvantage. Furthermore, the. elongated structure makes flux containment difficult in the borehole geometry.

In classical circular betatrons, focusing is typically achieved by using two opposed magnet poles to provide a magnetic field traversing the substantially circular electron orbit between the poles. This type of focusing is quite weak, and by itself does not permit sufficient electron charge to be trapped and accelerated to the full desired energy. Auxiliary focusing, while useful in surface betatrons, is not practical for borehole applications because of space limitations in the borehole.

Consequently, conventional circular betatrons have been either too bulky and inefficient or of too low electron current for use as a borehole photon source.

There is, therefore, a continuing need for particle accelerators which meet the constraints imposed by the hostile borehole environment, e.g., high temperature, restricted space, limited power supply, etc., while at the same time affording the desired photon output requirements in a low cost, reliable package.

BRIEF DESCRIPTION OF THE DRAWINGS

For a better understanding of the invention, reference may be made to the following description of representative embodiments thereof, taken together with the accompanying drawings, in which.

SUMMARY

Figure 1:
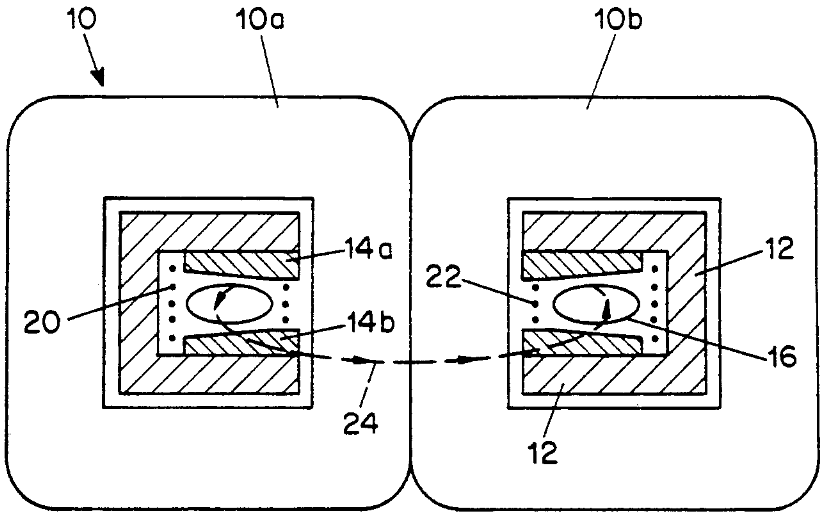
FIG. 1 is a schematic sectional view of the basic magnetic circuit and coil structure of a circular magnetic induction accelerator constructed in accordance with the invention.

In accordance with the invention, a compact circular magnetic induction accelerator, or betatron, adapted for use in a borehole includes a magnetic circuit having a field magnet and generally circular opposed pole pieces composed of a class of ferrite having the general formula $M^{2+}Fe_2^{3+}O_4$, where M represents two or more divalent metal ions from the group consisting of Mn, Zn and Ni. The core magnet is comprised of one or more closed loop sections, with one leg of each loop extending axially through the center of the circular pole pieces. In a preferred embodiment for borehole use, the core magnet comprises two symmetrically arranged closed loops. The core magnet is made of a low magnetic loss material, and preferably from multiple wound layers of a metallized tape such as Metglass tape or from a combination of Metglass tape and ferrite. This construction and composition of the field and core magnets maximizes the saturation flux density and charge retention capacity of the magnetic circuit within the space constraints of the borehole environment.

The excitation circuits may be arranged with the field magnet coil and the core magnet coil coupled either in parallel or in series. In accordance with the invention, various techniques may be employed to control the compression and expansion of the electron beam orbits to effect beam capture and ejection. A switchable orbit expansion coil is preferably connected in series with either or both the field coil and the core coil, and is switched in or out of the circuit at the appropriate times in the operating cycle to disrupt the betatron flux condition and eject the electron beam from its normal circular orbit. Upon ejection, the beam strikes the target and produces high energy gamma ray photons. The orbit expansion coil may be tunable and also function as an orbit position tuning (OPT) coil. Alternatively, a separate OPT coil may be provided.

In one embodiment where the field magnet and the core magnet are connected in parallel, beam compression and entrapment may be accomplished by means of a reverse-wound coil inductively coupled to the core magnet coil to buck the field coil flux in the core magnet. A brief pulse, preferably square shaped, is generated in a pulse forming line inductively coupled to the core coil to abruptly break and restore the betatron condition during the electron injection and capture cycle. Alternatively, the pulse forming line can be omitted, and the required disruption of the betatron flux condition for beam injection and capture accomplished by including an OPT coil in series with the core coil and by selecting the impedance of the OPT coil core relative to that of the core magnet to produce a voltage partition transient of brief duration between the two coils upon application of the acceleration voltage pulses to the primary circuit. In this case, the electrons are injected simultaneously with the application of the acceleration voltage pulses.

In another embodiment, a reverse-wound coil, inductively coupled to the core magnet coil, is connected in series with the field magnet coil and with the switchable orbit expansion coil. A switchable orbit compression coil is connected in series with the core magnet coil. The orbit compression coil is switched out of the circuit at the end of the beam injection cycle and the orbit expansion coil is switched into the circuit at the end of the beam ejection cycle, thereby disrupting the betatron flux condition to effect beam capture and ejection.

In other embodiments where the field coil and the core coil are connected in series and both are inductively driven by a primary coil, a switch is coupled across the core coil so as, when conducting, to form a closed loop with the core coil. This disrupts the betatron flux condition in the magnetic circuit, causing the charged particles to spiral inwardly. Upon reopening of the switch, the betatron condition is restored and the particles are trapped in circular orbits. Energy efficiency is improved since the current flow in the closed loop also provides part of the ampere turns for the field magnet and thereby reduces the ampere turns supplied by the primary coil. An expansion coil and switch are coupled in series with the field and core coils to effect beam ejection. This construction eliminates the need for a reverse-wound coil to buck the core flux induced by the field coil. It also enhances the energy efficiency of the betatron and the excitation system. The betatron condition can be established by proper selection of the turn ratio of the field and core coils or, if desired, by provision of an OPT coil.

To further simplify the excitation circuitry, the primary coil and the field coil may be combined into a common coil. Also, the expansion and compression switches may be arranged so as to be conducting only during the short ejection and injection cycles and not during the main acceleration cycle. Thus not only are losses attributable to the operation of the switches reduced, but lower cost switches may be employed, affording still further economies.

DESCRIPTION OF PREFERRED EMBODIMENTS

For purposes of density or other logging of earth formations for which a high energy photon source is employed, it is desirable to have a sufficiently high end point beam energy, preferably >2 MeV, and high average beam current, preferably >1 μA. The maximum beam energy of a betatron is proportional to the area enclosed by the electron orbit as well as the saturation flux density of the material used for the induction core magnet. Because the size of the electron orbit is limited by the diameter of the well bore, achieving >2 MeV beam energy generally requires >10 Kgauss saturation flux density for the induction core magnet. Because, as noted previously, space constraints in the borehole environment makes auxiliary focusing impractical (with resulting low charge current), to achieve an average beam current >1 μA the accelerator must be operated at a high repetition rate, e.g. in the range of several KHZ. It is also important that the desired beam energy and beam current be attained at a power level within the feasibility of downhole logging tools. This may be on the order of 2 Kw, but is preferably 1 Kw or less.

FIG. 1 illustrates the basic magnetic circuit and coil structure of a compact betatron which meets the foregoing criteria.

In accordance with the invention, the core magnet 10 is comprised of symmetrical closed-loop sections **10*a* and 10*b* made of built-up layers of a low magnetic loss metallical tape, such as Metglass, which is commercially available from the Magnetics Division of Spang Industries, Inc. and other suppliers. The sections 10*a* and 10*b* are preferably circular or rounded in cross section (see FIG. 2) and are also rounded at the corners (see FIG. 1). For ease of machineability of the core sections and of control of the electron beam path, the core may be made up of a composite of Metglass tape and a ferrite, e.g. a Ni-Zn ferrite, although this will result in the core having a somewhat lower saturation flux density. The core sections 10*a* and 10*b* encircle a field magnet 12, which carries a pair of opposed generally circular tapered pole pieces 14*a* and 14*b*. As a feature of the invention, both the field magnet 12 and the pole pieces 14*a* and 14*b*** are composed of a class of ferrite having the general formula $M^{2+}Fe_2^{3+}O_4$, where M represents two or more divalent metal ions from the group consisting of manganese, zinc and nickel. (As will be understood, Mn-Zn ferrites are made from mixtures of MnO, ZnO and $Fe_2O_3$, and Ni-Zn ferrites are made from mixtures of NiO, ZnO and $Fe_2O_3$). For example, satisfactory results have been achieved by use of a Mn-Zn ferrite available from Ceramic Magnetics, Inc., under the designation Mn-80.

Positioned centrally between the pole pieces 14*a* and 14*b* in the path of the magnetic filed established therebetween is a ceramic or glass annular acceleration chamber 16. The acceleration chamber is preferably evacuated to $5\times10^{-9}$ mm of Hg or less.

Externally of the chamber 16 and surrounding both the pole pieces 14*a* and 14*b* and the central axial legs 18*a* and 18*b* of the core magnet 10 is the field coil 20. So wound, the field coil induces a magnetic flux in both the field magnet 12 ($\phi_f$) and the core magnet 10 ($\phi_c$). As described more fully hereinafter, a core winding or coil 22, surrounding only the axial core legs 18*a* and 18*b*, is connected in parallel (FIGS. 4, 6 and 7) or in series (FIGS. 8–11) with the field coil 20. Both coils 20 and 22, as well as all other windings, are preferably single layer windings to avoid the capacitive coupling effects induced between the turns of multiple layer coils.

Electrons injected into the chamber 16 are trapped therein by the applied magnetic field and are guided along generally circular orbital paths until the desired end point energy is achieved and are then ejected. As illustrated schematically in FIG. 2, electrons are injected into the vacuum chamber 16 by an injector 26 which extends through a port in the chamber wall. Immediately after injection, the betatron condition ($\Delta\phi c/\Delta\phi_f=\beta$, where $\beta$ is a geometrical constant), which is upset at injection, is reestablished and the electrons are caused to assume a generally circular orbit 24 within the chamber 16. After the electrons have been accelerated to the desired energy and beam current, the betatron condition is again upset and the electron beam is kicked out, or ejected, from the orbit 24 so as to impact against a target 28, thereby producing a flux of high energy gamma ray photons. The injector 26, target 28 and the associated structural and electrical connections are conventional.

Figure 3:
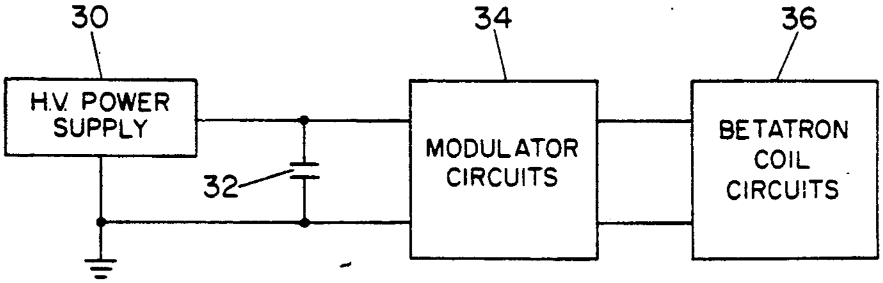
FIG. 3 is a block diagram of the basic electrical circuits of a betatron.

In a conventional betatron driving circuit, illustrated in FIG. 3, a high voltage D.C. power supply 30 is coupled across a capacitor 32 to modulator circuits 34 which pulse the primary betatron coil circuits 36 at the desired repetition rate with time-varying acceleration voltage pulses. During each acceleration cycle, the energy stored in the capacitor 32 is transferred to the betatron magnets through a switching network (not shown), and at the end of each cycle the remaining energy in the magnets is returned to the capacitor 32 through a recovery network (not shown). Losses in the system are replenished by the power supply 30, which for that purpose must have an output voltage equal to or greater than the maximum voltage intended for the capacitor 32. Although such a conventional driving circuit may be employed in conjunction with the present invention, a preferred driving circuit, which eliminates the need for a high voltage capacitor charging power supply, is disclosed in the aforementioned commonly-owned U.S. patent application Ser. No. 07/598,482, filed concurrently herewith, for Low Voltage Modulator for Circular Induction Accelerator.

In FIGS. 4 and 6–11, which illustrate representative embodiments of the betatron coil circuits 36 in accordance with the invention, the solid parallel lines opposite the coils indicate the core magnet and the dashed parallel lines indicate the field magnet. The dots adjacent the ends of the respective coils indicate the winding orientation of the coils.

Figure 4:
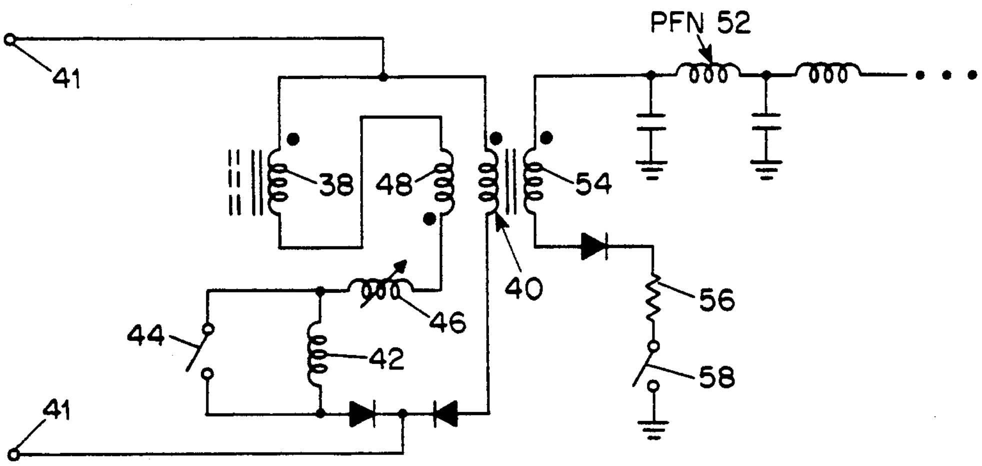
FIGS. 4 and 6–11 are schematic circuit diagrams of various arrangements of the field coil, core coil and associated circuits for compressing and expanding the electron orbits within the acceleration chamber.

In FIG. 4, the field coil 38, surrounding both field and core magnets, is coupled in parallel to the core coil 40, surrounding only the core, between the nodes 41 of the primary circuit. Connected in series with the field magnet 38 is an orbit expansion, or beam ejection, circuit including an expansion coil 42 and a normally-closed switch 44. If desired or necessary, an orbit position tuning (OPT) coil 46 may be provided in series with the core coil 40 or the field coil 38 to facilitate establishment of the betatron condition and adjustment of the electron orbit radius. Because the field coil 38 affects both the field magnet flux and the core magnet flux, a reverse-wound coil 48 is inductively coupled to the core coil 40 to offset the core magnet flux induced by the field coil 38, thereby decoupling the field coil 38 from the core magnet. Another coil 54, wound on the core, is coupled to a pulse forming network (PFN) 52 which, with coil 54 as its last stage, has an impedance 56.

Figure 2:
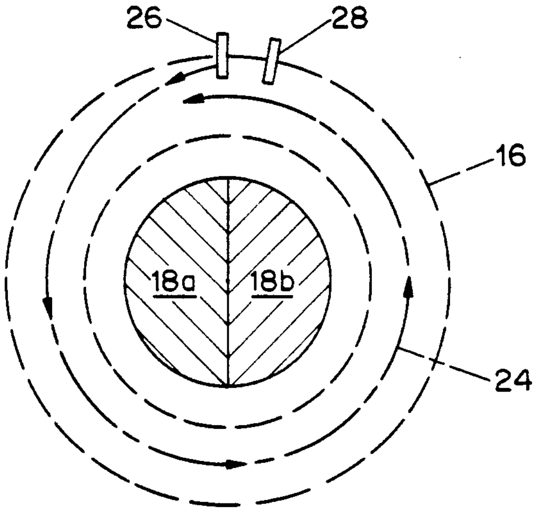
FIG. 2 is a schematic plan view illustrating the injection and entrapment of charged particles within the acceleration chamber of the betatron of FIG. 1.
Figure 5A:
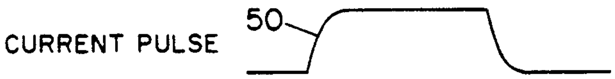
FIG. 5A, 5B, 5C are waveform diagrams showing the variation with time of the voltages across the low and high voltage capacitors and the current in the circuit during a charging/discharging/recovery cycle.
Figure 5B:
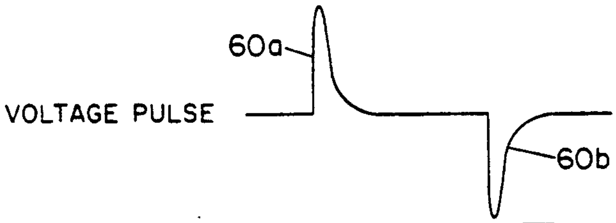
Figure 5C:
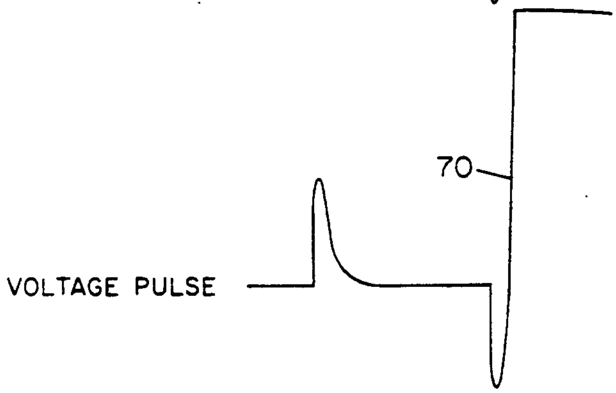

A conventional dc coil (not shown) provides a proper magnetic field in the orbital region which causes electrons to circulate in an orbit of constant radius before any voltage is applied to terminals 41. At injection, the switch 58 is closed and a sharp current pulse, indicated at 50 in FIG. 5A, is passed through coil 54. The rise and fall of the current pulse induces two voltage spikes across coil 54, shown at 60*a* and 60*b* in FIG. 5B. The negative going pulse 60B decelerates electrons. Since the applied magnetic field is maintained at a constant value during this time, this causes the electrons to spiral inwardly as illustrated in FIG. 2. The injection process terminates as the main acceleration voltage pulse 70 is applied to terminals 41. (See FIG. 5*c*.) The decelerating pulse 60*b* should be of relatively high amplitude and of sufficient duration to force the electrons inwardly quickly enough and far enough that they will not hit the target 28 in subsequent revolutions. The deceleration pulse 60*b* should also have a very sharp cut-off, preferably less that 10 nanoseconds, to prevent the electrons from spiralling into the inner wall of the acceleration chamber. To that end, the main acceleration pulse 70 must have a very fast rise time.

During electron injection and acceleration, the orbit expansion switch 44 is closed, shunting the coil 42 so that the magnetic flux between the pole pieces 14*a* and 14*b* is controlled by the voltage across the field coil 38, the core coil 40 and, if present, the OPT coil 46.

When it is desired to extract the electron beam in FIG. 4, the orbit expansion switch 44 is abruptly opened to bring the expansion coil 42 into series with the field coil 38. This produces a sudden voltage transient in the field coil and disrupts the betatron condition, kicking the electron beam out of orbit and into contact with the target 28.

Figure 6:
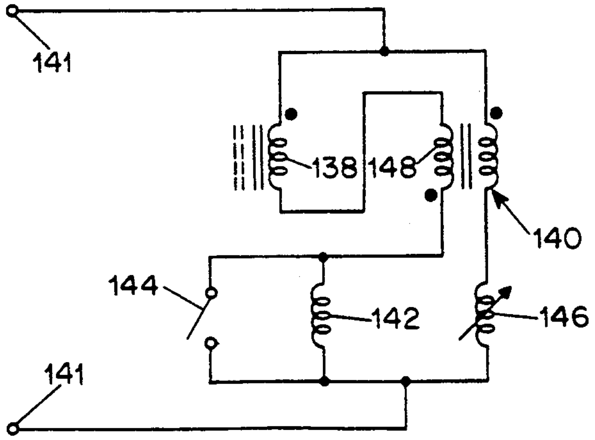

In the embodiment of FIG. 6, the field coil 138, core coil 140, expansion coil 142 and switch 144, and OPT coil 146 and reverse-wound coil 148 are similar to their counterparts in FIG. 4. The active circuit elements by which electron beam compression and capture are achieved in FIG. 4, namely the coil 54, switch 58 and the pulse-forming line 52, however, are omitted, and beam compression and capture are accomplished passively in the following manner.

Electrons are ejected into the acceleration chamber simultaneously with the application of the acceleration voltage pulses to the nodes 141 of the primary betatron coil circuits. For waveform frequencies below a certain threshold (depending upon the core material), the inductance of coil 140, which is wound on a closed core, is much higher than the inductance of coil 146 which is a solenoid with an adjustable iron slug. Thus, most of the voltage applied to nodes 141 should appear across coil 140. This, however, is not true during the initial transient period. In fact, immediately after the voltage is applied to nodes 141, a voltage spike occurs across the OPT coil 146, disrupting the betatron condition for the duration of the transient and causing the injected electrons to spiral inwardly. The duration of the transient condition is dependent on the response time of the core magnet material relative to that of the OPT coil core material. The betatron condition must be reestablished before the electrons spiral into the inner chamber wall. It has been found that the use of Mn-Zn ferrite for both the betatron core and the OPT core provides a response time on the order of 50 nanoseconds, and that this is fast enough to achieve proper beam compression and capture. As will be understood, the duration of the transient voltage partition between the OPT coil 146 and the core coil 140 is a function of the relative impedance between the two coils, which in turn is a function of the material composition and geometry of the cores. By appropriate selection of core materials and geometry, beam compression and capture can be achieved without the need for a separate coil or other active circuit elements. The use of active circuit elements for that purpose. however, is advantageous where, for other reasons. it is not desirable to use a fast recovery time material for the core magnet.

Figure 7:
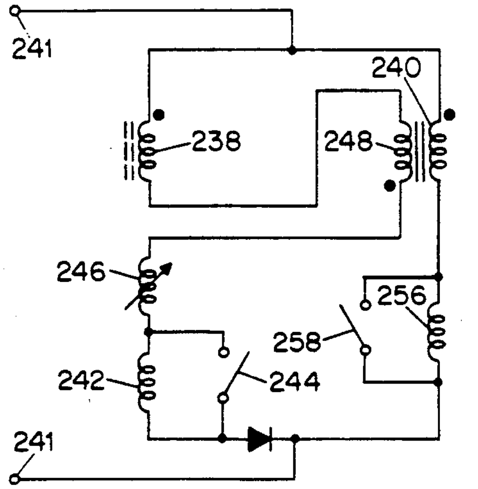

In the embodiment of FIG. 7, the field coil 238, the reverse wound coil 248, the OPT coil 246 and the expansion coil 242 are all connected in series. As in FIGS. 4 and 6, a normally-closed orbit expansion switch 244 bridges the expansion coil 242. Additionally, the core coil 240 and an orbit compression coil 256 and switch 258 are connected in parallel to the coils 238, 248, 246 and 242. In operation, the orbit expansion switch 244 is closed during both electron injection and acceleration, whereas the orbit compression switch 258 is open during injection and closed during acceleration and expansion. The acceleration voltage pulses are applied across the nodes 241 with compression switch 258 open. The inherent capacitance of switch 258, in conjunction with coils 256 and 240, causes the voltage across coil 240 to oscillate. By proper selection of the inductance of coil 256, the voltage across coil 240 can be made to go to zero or negative while the magnetic field in the orbit region rises steadily due to the applied voltage to nodes 241, thereby disrupting the betatron condition and causing the electrons to spiral inwardly. The switch 258 is thereupon closed, preferably when the voltage across 240 is zero or negative, forcing the voltage onto the core coil 240 and restoring the betatron condition to capture the electron beam. The OPT coil 246 and the expansion coil 242 and switch 244 function as described in connection with FIG. 4.

The embodiment of FIG. 7 provides for active beam compression and capture, but without a separate pulse forming line as in FIG. 4. Because the orbit expansion and compression switches in FIGS. 4, 6 and 7 are conducting during the acceleration cycle, they must be able to withstand the primary excitation energy applied to the betatron circuits.

FIGS. 8–11 depict still other embodiments of the betatron coil and control circuits, in which the coils driving the field magnet and the core magnet are connected in series and in which the need for a reverse-wound coil to buck the field coil is eliminated. Because of the gap in the field magnet circuit, the inductance of the field coil is much lower than that of the core coil which is wound on a closed loop. Thus, the inductance of the betatron is much lower in a parallel connection, such as those shown in FIGS. 4, 6 and 7, than in a series connection. Since the magnetic energy corresponding to a given final beam energy is $LI^2/2$, where L is the betatron inductance and I is the current, and since the energy efficiency of the betatron and the modulator system is higher for a lower current, it is desirable to have the betatron inductance as high as possible. The embodiments of FIGS. 8–11, therefore, afford enhanced efficiency while at the same time saving copper and space, all of which are important characteristics in a borehole betatron.

Figure 8:
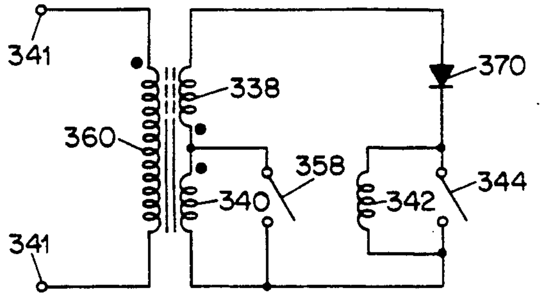
Figure 9:
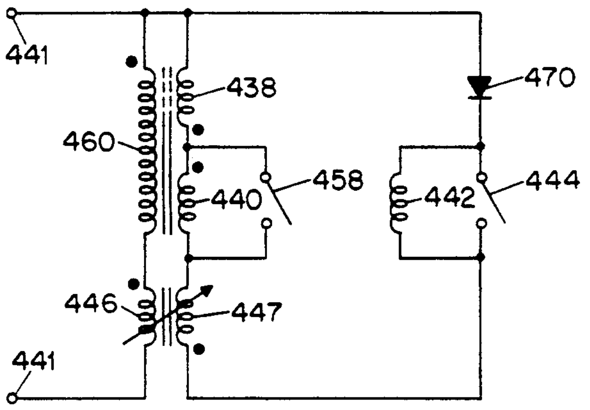
Figure 10:
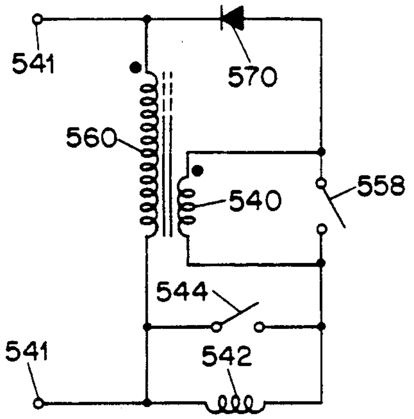

The basic concepts in FIGS. 8–11 are the same, and like components in the figures are numbered serially in increments of 100. In FIG. 8, the coil 360 is the primary drive coil. It and the field coil 338 surround both the field and the core magnets. During beam acceleration, the switch 344 is closed and switch 358 is open. The betatron condition is enforced by the requirement that the sum of voltages across the core coil 340 and the field 338 be equal to zero. If the field magnet is so designed that the betatron condition can be established by properly selecting the turn ratio of coils 338 and 340, no additional OPT coil is necessary. The coil 342 and the associated switch 344 are for orbit expansion purposes. If, for any reason, small orbit adjustments are necessary, an OPT coil can be inserted into the circuit. Because the flux change in the OPT coil must be proportional to the flux change in the field magnet 338, its ampere-turns should be proportional to that of the field magnet 338. One way to accomplish this is depicted in FIG. 9, in which the OPT coil consists of a primary coil 446 and a secondary coil 447, the turn ratio of which is the same as the turn ratio between the coils 460 and 438. In some cases it may be advantageous to make the number of turns of the coils 338 and 360 in FIG. 8 the same, in which case the two coils can be combined into a single coil to simplify the circuit complexity, as shown in FIG. 10. FIGS. 8 and 10 are otherwise equivalent electrically.

Figure 11:
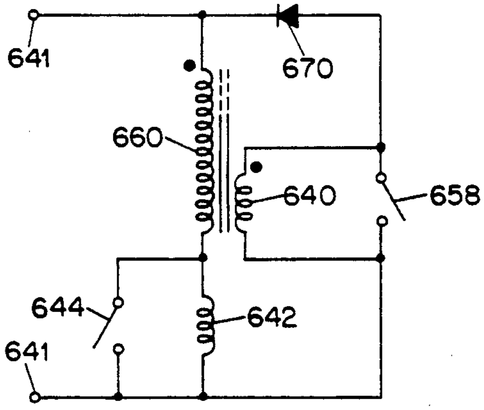

The circuit depicted in FIG. 11 is similar to that in FIG. 10 except for the placement of the coil 642 and the switch 644. Since the same current flows through both coils 660 and 642, the voltage across coil 642 is proportional to the rate of flux change in the field magnet 638. Thus, with the switch 644 open during acceleration, the betatron condition can be established provided that coils 660, 640 and 642 have the proper number of turns.

At beam injection, a positive voltage is applied across the nodes 341–641 in the circuits of FIGS. 8–11. The switch 358–658 is initially closed in all four cases and the switch 344–644 is closed for FIGS. 8–10 and open for FIG. 11. This reverse biases diode 370–670, causing it to be nonconductive. Also, the switch 358–658, when closed, forms a closed loop with the core coil 340–640. This keeps the core flux essentially unchanged. Thus, the coil 360–660 drives only the field magnet 338–638, causing the electrons to spiral inwardly away from the injector. At the end of the injection period, the switch 358–658 is opened. The number of turns of coil 340–640 is such that the induced voltage across coil 340–640 causes the diode to become forward biased. Thereupon, the voltage balance between the various coils (338, 340 in FIG. 8, 438, 440, 447 in FIG. 9, 560, 540 in FIG. 10, 660, 640, 642 in FIG. 11) is restored and the betatron condition is satisfied. The speed at which the betatron condition is established depends upon the turn-off time of the switch 358–658, the current at the time the switch opens, and the impedance between nodes 341–641. For best performance, the impedance between nodes 341–641 should be as small as possible.

At beam ejection, the state of the switch 344–644 in FIGS. 8–11 is changed (i.e. from open to closed or vice versa). As described in connection with earlier embodiments, this disrupts the voltage balance in the circuit and causes the beam to be kicked out of the orbit against the target.

Because the current flow in the loop comprising the coil 340–640 provides part of the ampere turns for the field magnet, the current that must be delivered through nodes 341–641 and the modulation frequency (inversely proportional to the time it takes for the current through nodes 341–641 to reach the peak) are both reduced. The energy efficiency, therefore, improves. The circuit shown in FIG. 11 has the added advantage that both switches 658 and 644 are conducting only during the short injection and ejection cycles and not during the main acceleration cycle. The losses attributable to operation of the switches are substantially reduced. Also, since the main excitation energy does not pass through the switches 658 and 644, relatively inexpensive MOSFET switches can be used. Hence economies of cost, size, energy loss and complexity all are realized.

Figure 12:
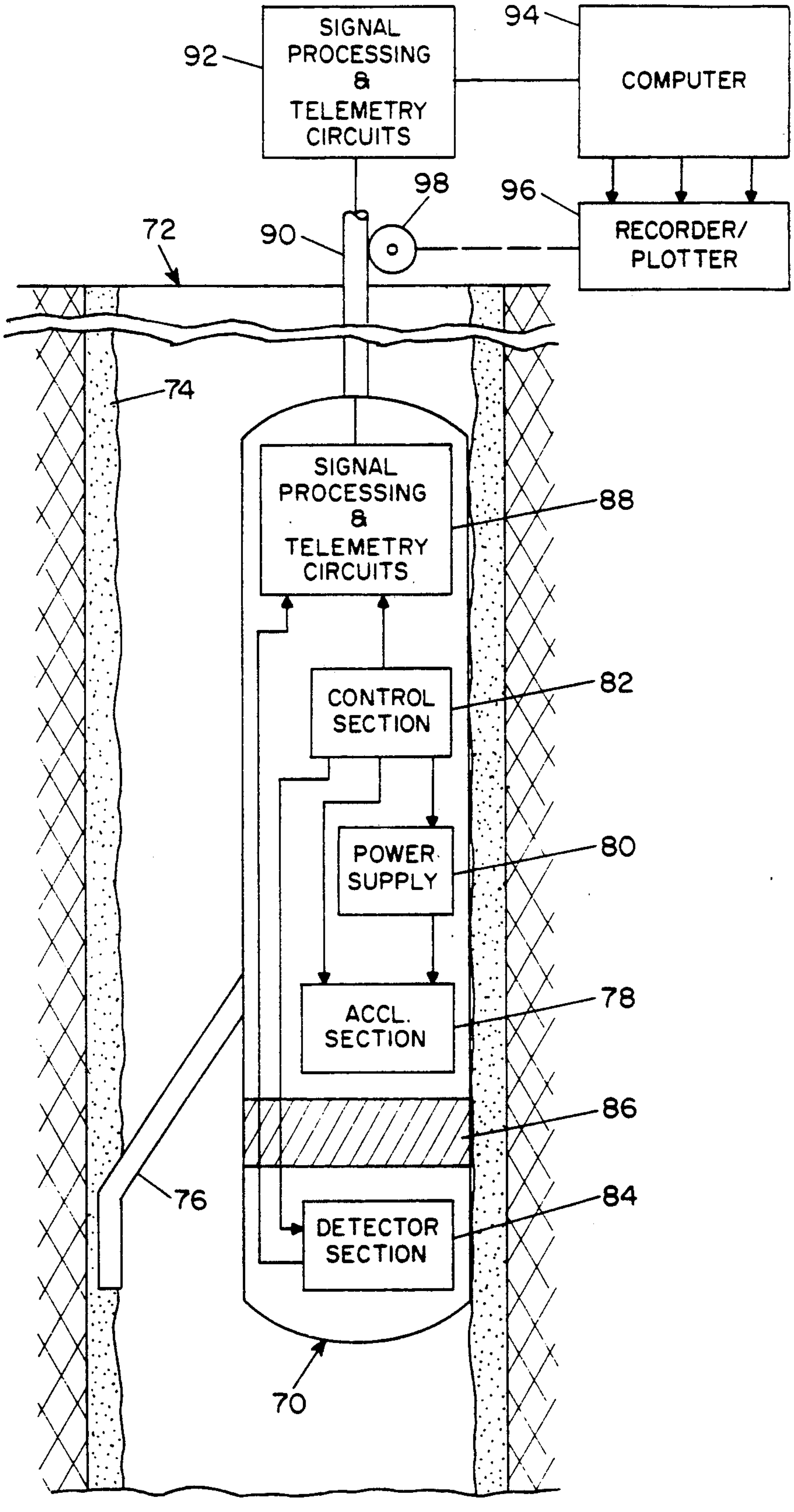
FIG. 12 is a schematic view of a borehole logging tool incorporating a betatron, constructed in accordance with the invention, as a downhole photon source.

The use of a compact betatron of the foregoing type as a borehole photon source in a density logging tool is illustrated in FIG. 12. A downhole sonde 70 is shown suspended in an open borehole 72 covered with mudcake 74. An articulated arm 76 urges the sonde against the borehole wall. The sonde includes an accelerator section 78, which contains the betatron, and a power supply 80 and a control section 82 for the betatron. Other power supplies (not shown) are provided as needed for the other downhole components, as is conventional. The control section 82 contains the modulator circuits and other circuits, as shown in FIGS. 3–7, needed to drive the betatron. A detector section 84 is spaced from the accelerator section 78 and is shielded therefrom by a gamma ray absorber 86. The detector section preferably includes two or more gamma ray detectors spaced at different distances from the accelerator 78. Both the control section 82 and the detector section 84 are connected to a downhole signal processing and telemetry section 88, which interfaces over the logging cable 90 with surface signal processing and telemetry circuits 92. The circuits 92 are connected to a truck or skid-mounted computer 94 for processing of the short-spacing and long-spacing detector data to calculate borehole and mudcake-compensated bulk density measurements. These measurements are output to a recorder/plotter 96 which makes the customary visual and/or tape log as a function of depth in the borehole. To that end, the recorder/plotter 96 is coupled to a cable-follower mechanism 98, as illustrated schematically in FIG. 8.

In addition to the density curve, a log of the compensation factor, referred to as the $\Delta\rho$ curve, is typically generated and recorded. This trace represents the correction made to the apparent density values computed from the long-spacing detector data. The computer 94 may also be programmed to measure photoelectric cross section properties from the low energy portion of the scattered gamma ray spectrum, from which information of formation lithology may be derived. The techniques by which bulk density values, $\Delta\rho$ values, and photoelectric cross section measurements are derived from a two-detector formation density tool of the type depicted in FIG. 8 are well known in the art. More detailed information regarding those techniques may be found, for example, in "The Dual Spacing Formation Density Log", Wahl et al., 39th SPE Annual Meeting, 1964; "The Litho-Density Tool Calibration", Ellis et al., Paper SPE 12048, SPE Annual Technical Conference and Exhibition, 1983; and "The Application of Full Spectrum Gamma-Gamma Techniques to Density/Photoelectric Cross Section Logging", Paper DDD, SPWLA 27th Annual Symposium, 1986.

Although the compact betatron of the present invention is shown as having particular usefulness as a gamma ray source for bulk density logging, it is not limited to such use but may be used for other logging applications as well where a gamma ray source is needed. It is useful, for example, where variable gamma ray energy levels or different source spectrum shapes are desired, both of which are attainable with the borehole betatron of the invention.

Although the invention has been described and illustrated herein by reference to specific embodiments thereof, it will be understood that such embodiments are susceptible of variation and modification without departing from the inventive concepts disclosed. All such variations and modifications, therefore, are intended to be included within the scope and meaning of the appended claims.

We claim:

1. In a magnetic induction accelerator including a magnetic induction accelerator including a magnetic circuit having a field magnet, a pair of opposed generally circular pole pieces, a core magnet, an excitation circuit including a field coil surrounding said field magnet and said core magnet and a core coil surrounding said core magnet, an annular acceleration chamber interposed between said pole pieces, means for applying time-varying acceleration voltage pulses across said circuit for accelerating charged particles in said acceleration chamber, means for injecting charged particles into the acceleration chamber, means for compressing the particle orbits to trap particles within generally circular orbits in said acceleration chamber, and means for expanding the particle orbits to eject particles from said generally circular orbits, the improvement comprising:

said field magnet and said pole pieces being composed of a class of ferrite having the general formula $M^{2+}Fe_2^{3+}O_4$, where M represents two or more divalent metal ions from the group consisting of Mn, Zn and Ni; and said core magnet comprises at least one closed loop section, with one leg of each loop passing axially through the center of the circular pole pieces and through said core coil.

2. The accelerator of claim 1 wherein said core magnet is composed at least in part of a low magnetic loss wound tape.

3. The accelerator of claim 1 wherein said core magnetic comprises two diametrically opposed closed loop sections.

4. The accelerator of claim 3 wherein said core magnet is composed at least in part of a low magnetic loss wound tape.

5. The accelerator of claim 1 wherein:

said field coil and said core coil are connected in parallel; and said orbit expansion means comprises an expansion coil connected in series with said field coil and said core coil, and switchable means for introducing a voltage transient across said expansion coil so as to disrupt the betatron flux condition in said magnetic circuit, whereby the charged particles are ejected from the generally circular orbits.

6. The accelerator of claim 1 wherein said orbit compression means comprises:

a reverse-wound coil inductively coupled to said core coil; and means for introducing deceleration voltage pulses across said reverse-wound coil so as to disrupt the betatron flux condition in said magnetic circuit, whereby the charged particles are trapped in said generally circular orbits.

7. The accelerator of claim 6 wherein said deceleration pulse means comprises pulse forming line means for applying substantially square-shaped current pulses to said reverse-wound coil.

8. The accelerator of claim 5 wherein:

said orbit compression means comprises a tunable coil connected in series with said core coil, the impedance of said tunable coil differing from the impedance of said core coil such that said time-varying acceleration voltage pulses produce a voltage partition across s id core coil and said tunable coil which disrupts the betatron flux condition in said magnetic circuit, the duration of said voltage partition being determined at least in part by the voltage recovery time of said core magnet; and said core magnet is composed of said class of ferrite.

9. The accelerator of claim 5 wherein said orbit compression means comprises switchable means for completing and breaking a closed loop circuit with said core coil, said closed loop circuit, when completed, inducing a magnetic flux in said core magnet so as to disrupt the betatron flux condition in the magnetic circuit, whereby the particles are trapped in said generally circular orbits.

10. The accelerator of claim 9 wherein said orbit expansion coil comprises a tunable coil for tuning the orbits of said charged particles.

11. The accelerator of claim 5 wherein:

said orbit compression means comprises a compression coil connected in series with the core coil and switchable means for selectively shunting said compression coil, said switchable means of said orbit compression means being closed to shunt said compression coil during the orbit compression phase of operation, whereby the particles are trapped in said generally circular orbits, and open during all other phases of operation; and said switchable means of said orbit expansion means being open during the orbit expansion phase of operation and closed during all other phases of operation.

12. The accelerator of claim 1 wherein said excitation circuit includes a primary coil inductively coupled to both said field coil and said core coil.

13. The accelerator of claim 10 wherein said orbit expansion means includes:

an expansion coil connected in series with said core coil and said field coil; and switchable means for introducing a voltage transient across said expansion coil so as to disrupt the betatron flux condition in said magnetic circuit, whereby the charged particles are ejected from the generally circular orbits.

14. The accelerator of claim 13 wherein said orbit compression means comprises switchable means coupled across said core coil for completing or breaking a closed loop circuit with said core coil, said closed loop circuit, when completed, disrupting the betatron condition in the magnetic circuit, whereby the particles are trapped in said generally circular orbits.

15. The accelerator of claim 12 wherein said primary coil and said field coil have the same number of turns and comprise a common coil.

16. The accelerator of claim 12 wherein said excitation circuit further comprises tunable coil means for adjusting the particle orbits.

17. The accelerator of claim 16 wherein said tunable coil means comprises first and second inductively coupled coils, the turn ratio of said first and second coil being substantially the same as the turn ratio of said primary coil and said field coil.

18. In a downhole logging sonde adapted to be moved through a borehole, a source of gamma rays in said sonde for irradiating earth formations traversed by the borehole, one or more gamma ray detectors for detecting gamma rays scattered back to the sonde from the irradiated earth formations, and means for transmitting signals representative of the detected gamma rays to the earth's surface for processing, the improvement wherein said gamma ray source comprises a magnetic induction particle accelerator, including:

a magnetic circuit having a field magnet, generally circular opposed pole pieces, and a core magnet comprising at least one closed loop section, with one leg of each loop passing axially through the center of the circular pole pieces,, said field magnet and said pole pieces being composed of a class of ferrite having the general formula $M^{2+}F_2{}^{3+}O_4$, where M represents two or more divalent metal ions from the group consisting of Mn, Zn and Ni;

an excitation circuit including a field coil surrounding said field magnet and said core magnet and a core coil surrounding said central axially leg of said core magnet;

an annular acceleration chamber interposed between said pole pieces;

means for applying time-varying acceleration voltage pulses across said primary excitation circuit;

means for injecting charged particles into orbit within said acceleration chamber;

means for compressing the particle orbits to trap particles within generally circular orbits within said acceleration chamber;

means for generating a particle accelerating magnetic flux in said magnetic circuit; an means for ejecting charged particles from said generally circular orbits and into contact with a target to produce gamma ray photons.

19. The logging sonde of claim 18 wherein said core magnet is composed at least in part of a low magnetic loss wound tape.

20. The logging sonde of claim 19 wherein said core magnet comprises two diametrically opposed, closed loop sections.

21. The logging sonde of claim 18 wherein:

said field coil and said core coil are connected in parallel; and said orbit expansion means comprises an expansion coil connected in series with said field coil and switchable means for introducing a voltage transient across said expansion coil so as to disrupt the betatron flux condition in said magnetic circuit, whereby the charged particles are ejected from the generally circular orbits.

22. The logging sonde of claim 21 wherein said orbit compression means comprises:

a reverse-wound coil inductively coupled to said core coil; and means for introducing deceleration voltage pulses across said reverse-wound coil so as to disrupt the betatron flux condition in said magnetic circuit and thereby trap the charged particles in said generally circular orbits.

23. The logging sonde of claim 22 wherein said deceleration pulse means comprises pulse forming line means for applying substantially square-shaped current pulses to said reverse-wound coil.

24. The logging sonde of claim 21 wherein:

said orbit compression means comprises a tunable coil connected in series with said core coil, the impedance of said tunable coil differing from the impedance of said core coil such that said time-varying acceleration voltage pulses produce a voltage partition across said core coil and said tunable coil which disrupts the betatron flux condition in said magnetic circuit, the duration of said voltage partition being determined at least in part by the voltage recovery time of said core magnet; and said core magnet is composed of said class of ferrite.

25. The logging sonde of claim 21 wherein said orbit compression means comprises switchable means for completing and breaking a closed loop circuit with said core coil, said closed loop circuit, when completed, inducing a magnetic flux in said core magnet so as to disrupt the betatron flux condition in the magnetic circuit, whereby the particles are trapped in said generally circular orbits.

26. The logging sonde of claim 25 wherein said orbit expansion coil comprises a tunable coil for tuning the orbits of said charged particles.

27. The logging sonde of claim 21 wherein:

said orbit compression means comprises a compression coil connected in series with the core coil and switchable means for selectively shunting said compression coil, said switchable means of said orbit compression means being closed to shunt said compression coil during the orbit compression phase of operation, whereby the particles are trapped in said generally circular orbits, and open during all other phases of operation;

said switchable means of said orbit expansion means being open during the orbit expansion phase of operation and closed during all other phases of operation.

28. The logging sonde of claim 21 wherein said excitation circuit includes a primary coil inductively coupled to both said field coil and said core coil.

29. The logging sonde of claim 28 wherein said orbit expansion means includes:

an expansion coil connected in series with said core coil and said field coil; and switchable means for introducing a voltage transient across said expansion coil so as to disrupt the betatron flux condition in said magnetic circuit, whereby the charged particles are ejected from the generally circular orbits.

30. The logging sonde of claim 29 wherein said orbit compression means comprises switchable means coupled across said core coil for completing or breaking a closed loop circuit with said core coil, said closed loop circuit, when completed, disrupting the betatron condition in the magnetic circuit, whereby the particles are trapped in said generally circular orbits.

31. The logging sonde of claim 28 wherein said primary coil and said field coil have the same number of turns and comprise a common coil.

32. The logging sonde of claim 28 wherein said excitation circuit further comprises tunable coil means for adjusting the particle orbits.

33. The logging sonde of claim 32 wherein said tunable coil means comprises first and second inductively coupled coils, the turn ratio of said first and second coil being substantially the same as the turn ratio of said primary coil and said field coil.

* * * * *